US009051478B2

(12) United States Patent
Peregi et al.

(10) Patent No.: US 9,051,478 B2

(45) Date of Patent: Jun. 9, 2015

(54) ADDITIVE COMBINATION FOR SEALANTS APPLICATIONS

(75) Inventors: Eva Peregi, Huningue (FR); Benno Blickenstorfer, Basel (CH); Frank Oliver Heinrich Pirrung, Grünstadt (DE); Petr Kvita, Reinach (CH)

(73) Assignee: BASF SE, Ludwigshafen (DE)

( * ) Notice: Subject to any disclaimer, the term of this patent is extended or adjusted under 35 U.S.C. 154(b) by 124 days.

(21) Appl. No.: 13/810,309

(22) PCT Filed: Jul. 19, 2011

(86) PCT No.: PCT/EP2011/062296

§ 371 (c)(1), (2), (4) Date: Jan. 15, 2013

(87) PCT Pub. No.: WO2012/010570

PCT Pub. Date: Jan. 26, 2012

(65) Prior Publication Data

US 2013/0112111 A1 May 9, 2013

Related U.S. Application Data

(60) Provisional application No. 61/366,554, filed on Jul. 22, 2010.

(30) Foreign Application Priority Data

Jul. 22, 2010 (EP) .................................... 10170448

(51) Int. Cl.

| | |
|---|---|
| ***C08K 5/34*** | (2006.01) |
| ***C08K 5/3492*** | (2006.01) |
| ***C08K 5/3435*** | (2006.01) |
| ***C08K 5/00*** | (2006.01) |
| ***C09D 7/12*** | (2006.01) |
| ***C08K 5/20*** | (2006.01) |

(52) U.S. Cl.

CPC ................ *C09D 7/1241* (2013.01); *C08K 5/20* (2013.01); *C08K 5/3435* (2013.01); *C08K 5/34926* (2013.01)

(58) Field of Classification Search

USPC .................................... 524/99, 100, 102, 285

See application file for complete search history.

(56) References Cited

U.S. PATENT DOCUMENTS

| | | | | |
|---|---|---|---|---|
| 4,935,275 | A * | 6/1990 | Ushida et al. | 428/31 |
| 4,985,479 | A | 1/1991 | Nagasaki et al. | |
| 7,109,260 | B2 * | 9/2006 | Kaprinidis et al. | 524/99 |
| 2008/0033080 | A1 | 2/2008 | Mader et al. | |
| 2011/0130492 | A1 | 6/2011 | Mader et al. | |

FOREIGN PATENT DOCUMENTS

| | | |
|---|---|---|
| EP | 0 781 800 | 7/1997 |
| GB | 2 335 190 | 9/1999 |
| JP | 2008-504422 A | 2/2008 |
| JP | 2009-543145 A | 12/2009 |
| WO | 2006 003092 | 1/2006 |
| WO | 2006 074969 | 7/2006 |
| WO | 2006 092363 | 9/2006 |
| WO | 2006 131455 | 12/2006 |
| WO | 2008 000646 | 1/2008 |

OTHER PUBLICATIONS

International Search Report Issued Oct. 28, 2011 in PCT/EP11/62296 Filed Jul. 19, 2011.

Office Action dated Feb. 9, 2015 issued in corresponding Japanese patent application No. 2013-520117.

* cited by examiner

*Primary Examiner* — Kriellion Sanders

(74) *Attorney, Agent, or Firm* — Oblon, McClelland, Maier & Neustadt, L.L.P.

(57) ABSTRACT

The present invention pertains to an additive combination comprising at least two sterically hindered amines, at least one further stabilizer, a dispersing agent and a plasticizer. The present invention also pertains to a composition comprising an organic material susceptible to degradation by light, oxygen and/or heat, and the additive combination and to the use and the process for stabilizing organic material against degradation by light, oxygen and/or heat by the additive combination.

21 Claims, No Drawings

ADDITIVE COMBINATION FOR SEALANTS APPLICATIONS

The present invention pertains to an additive combination comprising at least two sterically hindered amines, at least one further stabiliser, a dispersing agent and a plasticiser. The present invention also pertains to a composition comprising an organic material susceptible to degradation by light, oxygen and/or heat, and the additive combination and to the use and the process for stabilising organic material against degradation by light, oxygen and/or heat by the additive combination.

For instance, the present invention has the advantage of provision of a non-dusting solid light stabilizer additive as a liquid delivery form (dispersion), the extension of technology towards incorporation of insoluble stabilizer additives into existing customer formulations of adhesives and sealants, the extension of existing solid additives for a new application area, thus avoiding development and registration of new compounds, easy incorporation of the light stabilizer dispersion by simple stir-in process, avoiding mechanical dispersion of insoluble material at the moment of final formulation, leading otherwise to dust, clogging, sedimentation, lumps and/or heat generation, long term stability of the dispersed additive in the final formulation due to presence of a dispersant polymer, reduced haze in application media as a result of a small and homogenous particle size, universal applicability in a wide range of formulations due to the compatibility of the LS dispersion, for instance, the particle size is of <50 μm, preferred <10 μm, most preferred <5 μm, such as >0.01 μm.

The present invention pertains to an additive combination (for instance, also denominated as light stabiliser dispersion) comprising (A) at least two sterically hindered amines selected from the group consisting of compounds (A-i)-(A-v), (A-i)

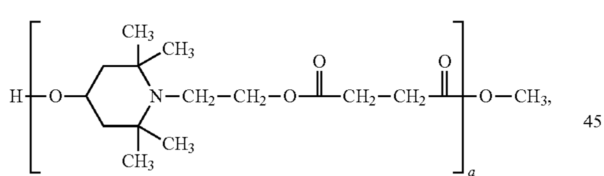

wherein a is 2-50, preferably is 2-20 (e.g. Tinuvin® 622, for instance, the condensate of 1-(2-hydroxyethyl)-2,2,6,6-tetramethyl-4-hydroxypiperidine and succinic acid, especially the compound with CAS-No. 65447-77-0)

(A-ii)

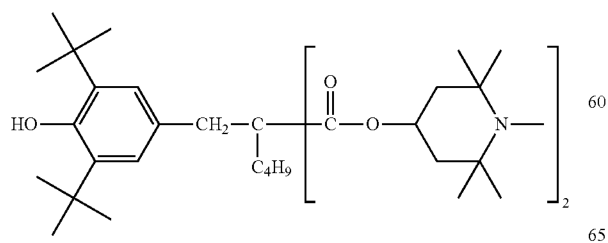

(e.g. Tinuvin® 144)

-continued (A-iii)

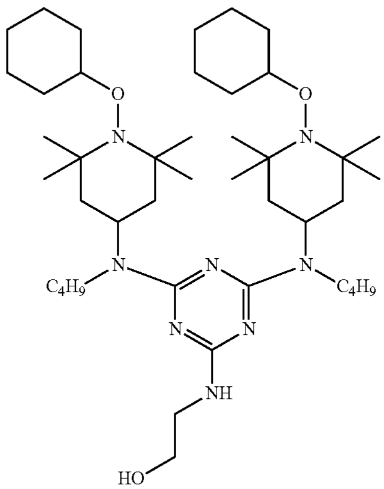

(A-iv) R—NH—$(CH_2)_3$—N(R)—$(CH_2)_2$—N(R)—$(CH_2)_3$—NH—R, wherein R is

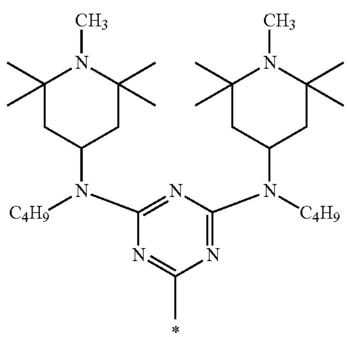

(e.g. Chimassorb® 119, especially the compound with CAS-No. 106990-43-6)

(A-v)

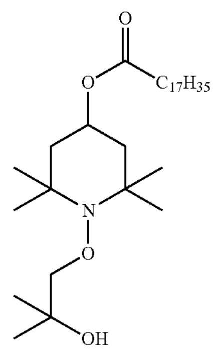

(B) at least one compound selected from the group consisting of (B-i) and (B-ii), (B-i)

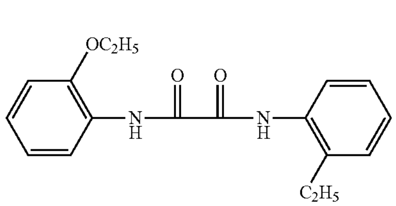

(e.g. Tinuvin® 312)

-continued (B-ii)

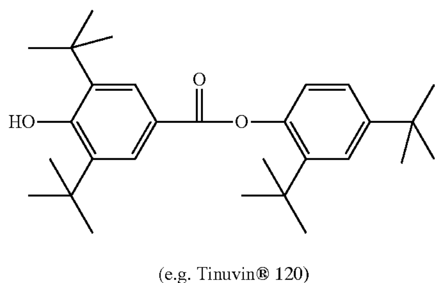

(e.g. Tinuvin® 120)

(C) a dispersant of formula (C-i)

(C-i)

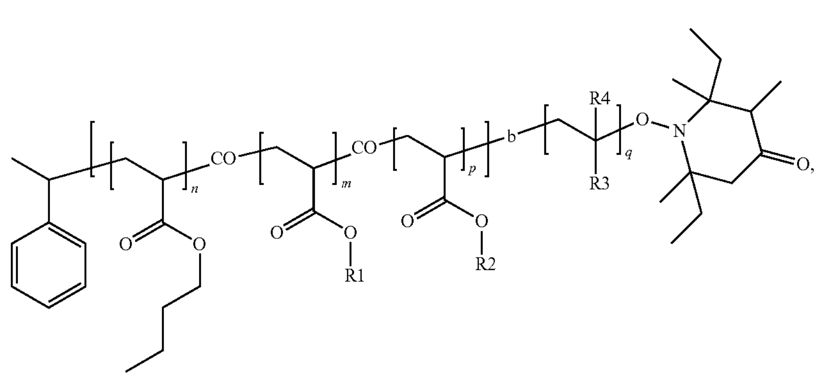

wherein

R1 is —($CH_2$—$CH_2$—O)$_r$—R5, wherein r is 2-100, and R5 is branched or linear $C_1$-$C_{18}$alkyl R2 is linear and/or branched $C_8$-$C_{20}$alkyl, R3 is $C_6$-$C_{12}$aryl, di-$C_1$-$C_4$dialkyl-amino$C_2$-$C_6$alkylene or $C_2$-$C_{12}$aminoaryl containing 1 to 3 ring-nitrogen atoms, whereby the aryl and aminoaryl are unsubstituted or substituted by $C_1$-$C_4$alkyl, R4 is H or $CH_3$, n and q are independently integers from 3 to 100, and m and p are independently integers from 0 to 100, and (D) a plasticiser.

For instance, component (A) is the two sterically hindered amines (A-i) and (A-ii).

For example, component (B) is the compound (B-i).

For instance, in component (C)

R1 is —($CH_2$—$CH_2$—O)$_r$—R5, wherein r is 2-20, and R5 is linear $C_1$-$C_4$alkyl, R2 is linear and/or branched $C_{10}$-$C_{18}$alkyl, R3 is pyridine, R4 is H, n is an integer from 20 to 90, q is an integer from 5 to 30, m is an integer from 0 to 60, and p is an integer from 0 to 30.

For instance, R1 is —($CH_2$—$CH_2$—O)$_r$—R5, wherein r is 2-20, and R5 is linear $C_1$-$C_4$alkyl, R3 is pyridine, R4 is H, n is an integer from 40 to 80, q is an integer from 5 to 25, m is an integer from 5 to 25, and p is 0.

In the definitions the term alkyl comprises within the given limits of carbon atoms, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, 2-methylheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, tridecyl, tetradecyl, pentadecyl or octadecyl.

The term alkylene comprises, for example ethylene, propylene, isopropylene, n-butylene, sec-butylene, isobutylene, tert-butylene, 2-ethylbutylene, n-pentylene, isopentylene, 1-methylpentylene, 1,3-dimethylbutylene or n-hexylene.

Aryl is for example phenyl, biphenyl or naphthalinyl.

The term aminoaryl comprises, for instance, pyridine, pyrimidine, pyridazine, pteridine, quinoline, isoquinoline or phthalazine, whereby pyridine is preferred.

For example, component (D) is a plasticiser selected from the group consisting of cyclohexane dicarboxylic acid ester (e.g. di-isononylcyclohexan-1,2-dicarboxylat), phthalates (e.g. bis-(2-propylheptyl)phthalate, bis(2-ethylhexyl)phthalate (dehp), diisononyl phthalate (dinp), bis(n-butyl)phthalate (dnbp, dbp), butyl benzyl phthalate (bbzp), diisoundecyl phthalate (diup), di-n-octyl phthalate (dop or dnop), diisooctyl phthalate (diop), diethyl phthalate (dep), diisobutyl phthalate (dibp), di-n-hexyl phthalate), trimellitates (e.g. trimethyl trimellitate (tmtm), tri-(2-ethylhexyl)trimellitate (tehtmmg), tri-(n-octyl,n-decyl)trimellitate (atm), tri-(heptyl,nonyl)trimellitate (ltm), n-octyl trimellitate (otm)), adipates (e.g. bis(2-ethylhexyl)adipate (deha), dimethyl adipate (dmad), monomethyl adipate (mmad), dioctyl adipate (doa)), maleates (e.g. dibutyl maleate, diisobutyl maleate), benzoates (e.g. alkyl benzoates), glycols, citrates (e.g. alkyl citrates, triethyl citrate, acetyl triethyl citrate, tributyl citrate, acetyl tributyl citrate, trioctyl citrate, acetyl trioctyl citrate, trihexyl citrate, acetyl trihexyl citrate, butyryl trihexyl citrate, trimethyl citrate), vegetable oils (e.g. epoxidized vegetable oils), succinates (e.g. dioctyl succinate), sebacates (e.g. dibutyl sebacate), fatty acid esters (e.g. methylstearate, ethyloleate), sulfonamides (e.g. ortho and para isomers of n-ethyl toluene sulfonamide, n-(2-hydroxypropyl)benzene sulfonamide, n-(n-butyl) benzene sulfonamide), organophosphates (e.g. tricresyl phosphate, tributyl phosphate), glycols (e.g. triethylene glycol dihexanoate, tetraethylene glycol diheptanoate), polyethers, polybutene, acetylated monoglycerides, alkyl sulphonic acid phenyl ester, and mixtures thereof.

For instance, the plasticiser (D) is a cyclohexane dicarboxylic acid ester or a phthalate, particularly preferred is di-isononylcyclohexan-1,2-dicarboxylat or bis-(2-propylheptyl)phthalate.

Particularly preferred is an additive combination comprising (A) the two sterically hindered amines (A-i) and (A-ii), (B) the compound (B-i), (C) a dispersant of formula (C-i), wherein R1 is —($CH_2$—$CH_2$—O)$_r$—R5, wherein r is 2-20, and R5 is linear $C_1$-$C_4$alkyl, R3 is pyridine, R4 is H, n is an integer from 40 to 80, q is an integer from 5 to 25, m is an integer from 5 to 25, and p is 0, and (D) a plasticiser selected from the group consisting of a cyclohexane dicarboxylic acid ester or a phthalate, particularly preferred is di-isononylcyclohexan-1,2-dicarboxylat or bis-(2-propylheptyl)phthalate.

Preferred is an additive combination additionally comprising a further additive (E).

Examples of such further additives (E) are such as given in WO-A-2008/000646, page 32, line 6 to page 43, line 4.

For instance, the further additive (E) is selected from the group consisting of solvents, surfactants, antioxidants, light stabilisers, metal deactivators, phosphites, phosphonites, hydroxylamines, nitrones, thiosynergists, peroxide scavengers, basic co-stabilisers, fillers, reinforcing agents, lubricants, emulsifiers, pigments, dyes, rheology additives, catalysts, flow-control agents, optical brighteners, flameproofing agents, antistatic agents, benzofuranones, indolinones, anti-gas fading agents, resins (F) and combinations thereof.

For example, the further additive (E) does not comprise a resin (F).

For instance, the further additive is a solvent, a surfactant or a combination thereof, in particular a surfactant or blends of different types of surfactants.

A surfactant is classified according to the formally charged groups in its head. If the charge of the head is negative, the surfactant is called anionic; if the charge is positive, it is called cationic. If a surfactant contains a head with two oppositely charged groups, it is termed zwitterionic or amphoteric. A non-ionic surfactant has no charge groups in its head.

Examples of some commonly encountered surfactants of each type include:

1) Anionic surfactants (based on sulfate, sulfonate, phosphate or carboxylate anions)

Perfluorooctanoate (PFOA or PFO) and Perfluorooctanesulfonate (PFOS)

Sodium dodecyl sulfate (SDS), ammonium lauryl sulfate, and other alkyl sulfate salts Sodium laureth sulfate, also known as sodium lauryl ether sulfate (SLES)

Alkyl benzene sulfonate

Soaps, or fatty acid salts

Phosphate esters of alkyl or ethoxylated alkyl alcohols, and alkali or ammonium salts thereof 2) Cationic surfactants (based on quaternary ammonium cations)

Cetyl trimethylammonium bromide (CTAB) and other tetralkylammonium salts with halides or alkylsulfates Alkylpyridinium halides, eg. based on cetyl chloride (CPC)

Ammonium salts based on polyethoxylated tallow amine (POEA)

Benzalkonium chlorides (BAC)

3) Zwitterionic (amphoteric) surfactants

CHAPS (3-[(3-Cholamidopropyl)dimethylammonio]-1-propanesulfonate)

Fatty Alkyl betaines, with dodecyl, cetyl or stearyl side chain and cocamidopropyl betaine Dodecyl dimethylamine oxide 4) Nonionic surfactants Alkyl poly(ethylene oxide)

Polysorbates based on Polyoxyethylene Glycol

Alkylphenol poly(ethylene oxide) APE

Copolymers of poly(ethylene oxide) and poly(propylene oxide)

Alkyl polyglucosides, including octyl glucoside and decyl maltoside

Fatty alcohols like cetyl and oleyl alcohol

Fatty alkylamides, like cocamide MEA and DEA

For example, the further additive is a solvent and has for instance a boiling point at atmospheric pressure below 250° C. and may be selected from the group consisting of esters, alcohols, ketones, ethers and aliphatic or aromatic hydrocarbons. A particular preferred solvent is an ester, in particular 1-methoxy-2-propyl acetate. For instance, the solvent can be added to the formulation and replace part of the plasticizer (D), or can be part of one of the delivery forms of the components (A) to (C).

Resins (F) can be added to the LS dispersion to achieve a better compatibiliy with the target formulations, eg. resin (F) is selected from the group consisting of polysulphides, rubbers, acrylates, silicones, functionalised polyethers, functionalised polyesters, functionalized polyacrylates and functionalised polyurethanes, preferably functionalised polyethers.

Components (A) to (E) are mainly items of commerce or can be obtained according to methods known in the art. Component (C) can for instance be obtained as described in WO-A-2006/074969 and according to the method described therein.

For instance, the weight ratio of component (A) is 1:0.1-10, the weight ratio of (A) to (B) is 1:0.1-20, the weight ratio of (A) to (C) is 10:0.1-20, the weight ratio of (A) to (D) is 1:0.1-50, and if component (E) is present, the weight ratio of (C) to (E) is 1:0.01-30.

For instance, component (A) is, for example two, sterically hindered amines with a weight ratio of 1:0.1-10, such as 1:0.3-8, especially 1:0.4-3, in particular 1:0.5-2, for example about 1:1. For example, the weight ratio of components (A):(B) is 1:0.1-20, such as 1:0.15-15, especially 1:0.5-3, in particular 1:1-2, for instance about 1:1.5. For instance, the weight ratio of components (A):(C) is 10: 0.1-20, such as 10:0.5-10, especially 10:1-4, for example about 10:1.5-3. For example, the weight ratio of components (A):(D) is 1:0.1-50, such as 1:1-30, especially 1:5-20, in particular about 1:9.5-10. For instance, if component (E) is present, the weight ratio of components (C):(E) is 1:0.01-30, for example 1:0.01-10, such as 1:0.05-10, especially 1:0.1-5, in particular 1:0.3-3. For example, if component (E) is present and comprises resin (F), the weight ratio of components (C):(F) is 1:1-30, such as 1:2-15.

The present invention also pertains to a composition comprising (I) an organic material susceptible to degradation by light, oxygen and/or heat, and (II) an additive combination as defined herein.

For example, the organic material (I) is a natural, semi-synthetic or synthetic polymer; examples thereof are given in WO-A-2008/000646, page 24, line 9 to page 30, line 2.

For instance, component (I) is a sealant or assembly adhesive.

For example, component (I) is selected from the substrates consisting of polysulphides, rubbers, acrylates, silicones, functionalised polyethers (e.g. based on polyethyl glycol, polypropyleneglycol, polyTHF), functionalised polyesters (e.g. based on polycaprolactone), functionalized polyacrylates (e.g. polybutylacrylates) and functionalised polyurethanes (e.g. based on aromatic and aliphatic isocyanates), preferably functionalised polyethers.

For instance, the functionalised polyether, functionalised polyester, functionalized polyacrylate and functionalised polyurethane are functionalised by silane.

For instance, functionalised by silane means terminated by silane. For example, component (I) is functionalised polyether, especially silane modified polyether, in particular silane terminated polyether.

For instance, component (II) is 0.005-0.5 parts by weight per part by weight of component (I), preferably 0.01-0.1, especially 0.02-0.09 parts by weight a per part by weight of component (I).

The additive combination (LS dispersion) may be prepared by a milling and dispersing process e.g. in a disperser or in a bead mill. An example of suitable grinding medium are commercially available glass, zirconium oxyde, Zirconium Silicate and Yttrium stabilized Zirconium oxyde beads in a size range of 0.2 to 5 mm. For instance, in the disperserser the ratio of LS dispersion material to the beads is about 2 to 1. For example, the volume of bead mill is filled to about 80% by the beads.

For instance, the liquid ingredients of the LS dispersion, i.e. the continous phase (D), dispersant (C), resins (F) and further additives (E) are charged together with the grinding medium into the disperser. For example, the solid light stabilizer (A and/or B) is added sequentially in portions, and the mixture is dispersed for a set period of time. For instance, for a dispersant the typical conditions could be 90 minutes at 1000 rpm, while the vessel is cooled externally.

For example, in a manufacturing process using a bead mill, all the components of the LS dispersion are premixed and afterwards pumped and circulated through the bead mill. For instance, the dispersion is cirulated through the mill until the desired particle size of the light stabiliser is achieved.

For instance, the final light stabiliser dispersions are obtained as free flowing, non-transparent liquids.

For example, the light stabiliser dispersions can be added to the organic material (I) such as the adhesives and sealants substrates by methods known in the art such as before or during mixing, compounding, extrusion or co-extrusion.

Some applications for adhesives and sealants of the present invention are deck bonding and sealing, port holes sealing, cables sealing, glazing, windows sealing, bathroom water-barrier sealing, window sealing and moisture barrier.

The present invention also pertains to the use of an additive combination as defined herein for the stabilisation of an organic material susceptible to degradation by light, oxygen and/or heat against degradation by light, oxygen and/or heat.

The present invention also pertains to a process for stabilising an organic material susceptible to degradation by light, oxygen and/or heat against degradation by light, oxygen and/or heat by applying to or incorporating into the organic material an additive combination as defined herein.

The present invention may also encompasses the preparation of the LS dispersion by a milling or dispersing process, in which the ingredients are formulated e.g. as described above.

All %, parts and ratio are weight-%, parts by weight and weight ratio unless otherwise stated.

EXAMPLES

Synthesis of Dispersant C:

The following Examples illustrate the invention.

Abbreviations and Reagents

GPC: gel permeation chromatography

PS-Standard: polystyrene standards for GPC calibration

THF: tetrahydrofurane

MPA: 1-methoxy-2-propyl acetate nBA: n-butylacrylate

MeOH: methanol

PD: Polydispersity. The polydispersity of a sample is defined as weight average molecular weight Mw divided by Mn and gives an indication how narrow a distribution is.

mbara=millibar absolute pressure

SC=solid content measurement by Halogen dryer Mettler Toledo HR 73 (at 150° C., 0.5 g sample). The result is obtained as weight %.

AV=amine value determined as mg KOH/g according to DIN 16945 §5.6 (1989)

VSC=dynamic viscosity as mPas or Pas according to DIN 53019 part 1 (1980) by Brookfield viscosimeter (model DV-E) at the specified temperature.

LIAL: LIAL® 125 A: mixture of straight chain and branched C12-15 alkanols (ratio 43:57) from Sasol Olefins and Surfactants GmbH with an average Mw of 207 g/mol.

MPEG 500: poly ethylene glycol monomethylether with average MW of 500, obtainable from Aldrich Inc.

4VP: 4-vinylpyridine, obtainable from company Schenectady International

LitOBu: lithium-tert-butoxylate obtainable from Aldrich Inc

LiOMe: lithium methoxide obtainable as 10% methanol solution from Aldrich Inc

NOR 01: polymerization regulator, which is prepared according to GB 2335190.

NOR 01

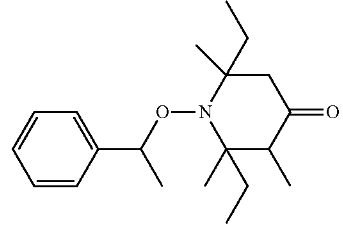

General remarks on the nomenclature and formulae given herein for polymeric compatibilizers Some products are prepared by transesterification, which proceeds at random. This is not reflected properly by many formulae, according to which it would seem that there is a block of butyl esters and a block of MPEG 500 esters like the formula in example D. Nevertheless, said formulae are illustrative. In contrast to the formulae, the abbreviated names better reflect which part of the polymer is random and which part is a block.

General Structure of AB-Block Copolymers:

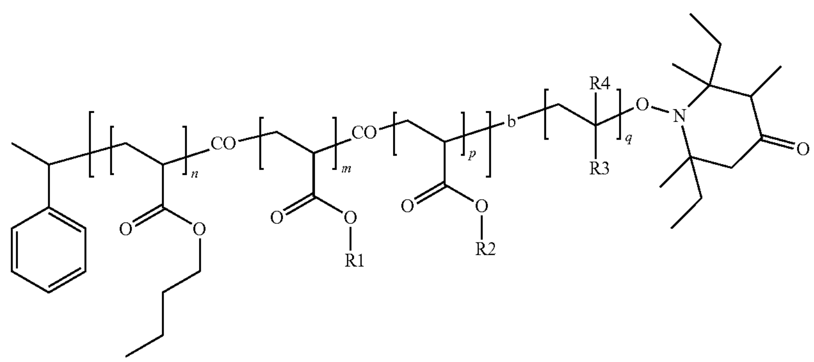

The general formula above shows that esters R1 and R2 are present at random by copolymerization (indicated by -co-) together with the butylesters in one block and the indices m and p show the approximated molar amounts of the respective esters after transesterification and are numbers from zero to 100. The sum of n+m+p=x, x being the original amount of n-butylesters in the non-transesterified base polymer, and n being the remaining n-butylesters after transesterification. The number of n and q is at least 3, with q being the amount of monomer units of the second block. The first block (A-block) is connected to the second (B-block) indicated by -b- and in which R3 represents aryl, dialkyl-aminoalkylene or aminoaryl group, and R4=methyl or H. It should, however, be noted that the abbreviated names do not mention the end groups on both sides of the polymer, i.e. e.g. the 1-phenylethyl group and the NOR fragment in Example D: poly([nBA-co-MPEG500A]-b-4VP).

Preparation of Polymers and Copolymers

Example A

Synthesis of a Linear Polymer poly(nBA)

-continued

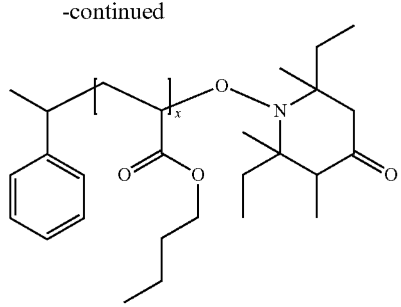

In a 3-necked 1000 ml round bottom flask with magnetic stirring bar, cooler, thermometer, dropping funnel 249.2 g n-butylacrylate (nBA, 128.17 g/mol), 14.2 g of NOR 01 (317.48 g/mol) and 202.7 g of MPA are added, three times degassed with $N_2$/vacuum and polymerized at 135° C. under $N_2$ until a conversion of around 8 mol % is reached. 562.6 g of nBA is slowly added to the reaction with the dropping funnel and polymerized at 135° C. under $N_2$ until a conversion of around 48 mol %. Residual monomers and solvents are distilled of at 80° C. and 12 mbara.

Yield 47% (388 g), GPC (THF, PS-Standard, Mn=7800 g/mol, PD=1.27), liquid. SC=98.75%, VSC=8560 mPas. According to analysis via $^1$H-NMR, the degree of polymerization is x=78.

Example B

Synthesis of a Linear Block Copolymer poly(nBA-b-4VP)

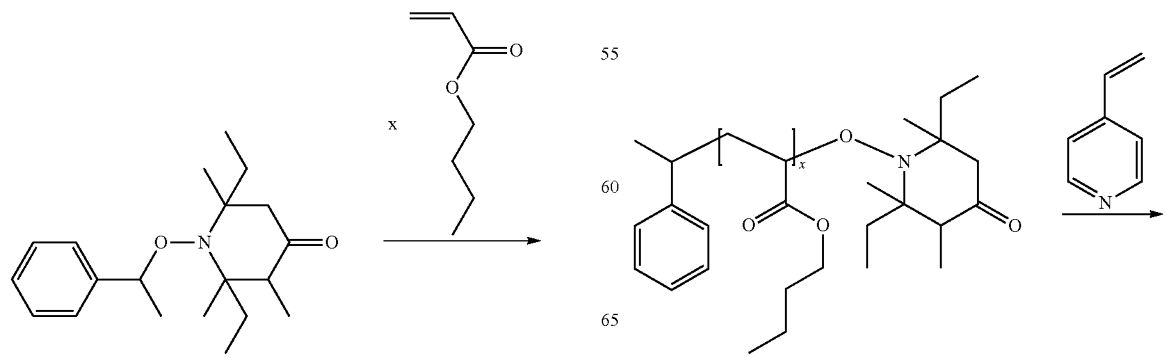

-continued

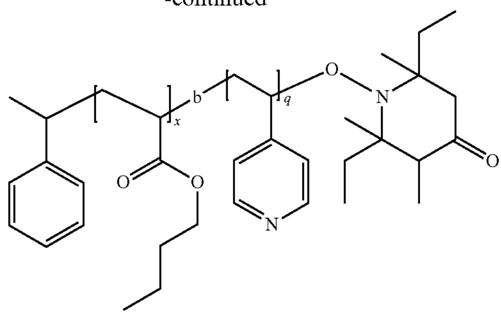

In a 3-necked 500 ml round bottom flask with magnetic stirring bar, cooler, thermometer 267.7 g of poly(nBA) according to example A with a polymerization degree of ca. 74 units of nBA (by 1H NMR), 88.6 g of 4-vinylpyridine (4VP, MW=105 g/mol) and 99.6 g of MPA are added, three times degassed with $N_2$/vacuum and polymerized at 125° C. under $N_2$ for 8 h. Residual monomers and solvents are distilled off at 80° C. and 20 mbara until a solid content of >98% is reached. Example B is obtained as a brownish highly viscous liquid (320 g). GPC (THF, PS-Standard) gave Mn=8600 g/mol and PD=1.24. The block lengths are determined by 1H NMR as x=73 units of nBA and q=15 units of 4VP. AV=72.2 KOH/g.

Example C

MPA Solution of Example B

The polymer of Example B (184.0 g) is dissolved in MPA (46 g) at 50° C. to a SC of ca. 80%. The product is obtained as a yellowish-brownish liquid with a SC of 80.6%, an AV of 58.7 mg KOH/g and a VSC of 68.7 Pas (20° C.)

Example D

Synthesis of poly([nBA-co-MPEG500A]-b-4VP)

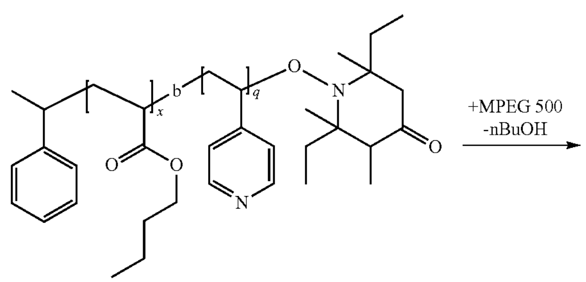

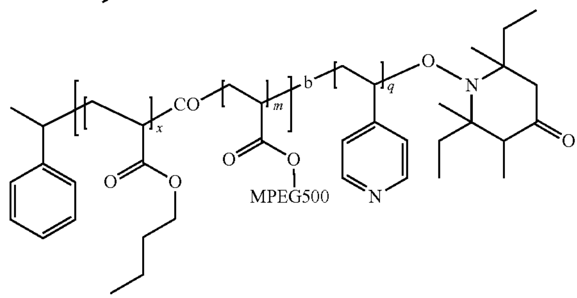

In a 350 mL flask equipped with a magnetic stirring bar, distillation column with dry ice acetone cooling 150.0 g of poly(nBA-b-4VP) in MPA, prepared according to example C is mixed with 80.0 g of MPEG500. At 90° C., the solvent is distilled off at reduced pressure, and further heated to 130° C. for one hour to remove traces of humidity. Three portions of 800 mg of LiOtBu are added during 6 h at 115-130° C. The formed n-butanol (ca. 11.8 g) is distilled off at reduced pressure (20 mbara) to a SC of 98.9% to yield D as brownish viscous liquid (188 g). The AV is determined at 54.4 mg KOH/g. Anaylsis via GPC as well as 1H-NMR indicate complete conversion of the MPEG-OH. GPC: Mn=9120 g/mol, PD=1.87. The composition of D is determined by 1H NMR as poly([$nBA_{58}$-co-$MPEG500A_{15}$]-b-$4VP_{15}$).

Examples E to H

In analogous way as described for polymer D, the block polymers E to J containing MPEG 500 are prepared as brownish viscous liquids with the molar ratios indicated in Table 1.

TABLE 1 preparation of block copolymers containing MPEG 500 side chains

| Example | n | m | q | Mn g/mol | PD | SC % | AV mg KOH/g | VSC at 20° C. |
|---|---|---|---|---|---|---|---|---|
| D | 58 | 15 | 15 | 9120 | 1.87 | 98.9 | 54.4 | 311 Pas |
| E | 45 | 28 | 15 | 8960 | 1.81 | 99.3 | 41.1 | 50.7 Pas |
| F | 33 | 40 | 15 | 9260 | 1.58 | 99.4 | 32.5 | 21.2 Pas |
| G | 70 | 5 | 14 | 8039 | 1.43 | 99.6 | 65.3 | 954 Pas |
| H | 64 | 10 | 14 | 9677 | 1.57 | 98.5 | 52.7 | 730 Pas |

Legend:
n (mol units n-butylesters),
m (mol units MPEG500),
q (mol units 4VP)

Examples J to N

MPA solutions (ca. 50% solid content) of polymers D to H prepared in analogy to example C as brownish-yellowish liquids with viscosities below 1000 mPas at 20° C. indicated in Table 2:

TABLE 2

MPA solutions of block copolymers containing MPEG500 side chains

| Example | Polymer | Sol-vent | SC % | AV mg KOH/g | Aspect of liquid |
|---|---|---|---|---|---|
| J | D | MPA | 49.9 | 26.9 | Clear brownish |
| K | E | MPA | 52.2 | 21.7 | Clear orange |
| L | F | MPA | 51.0 | 16.8 | Clear dark yellow |
| M | G | MPA | 50.2 | 33.2 | Clear yellow |
| N | H | MPA | 50.4 | 26.3 | Clear dark yellow |

Example P

Synthesis of poly([nBA-co-LIALA]-b-4VP)

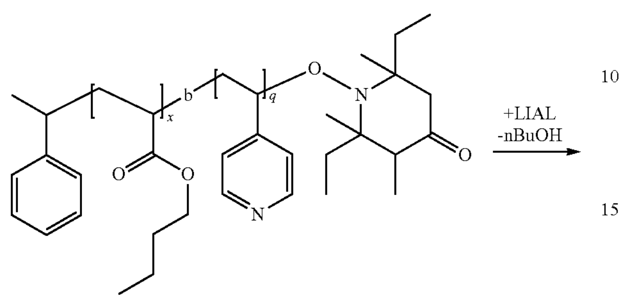

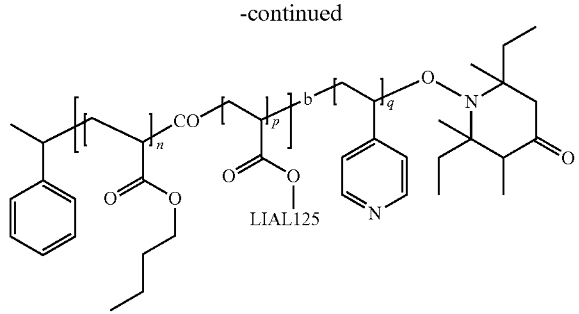

-continued

In a 350 mL flask equipped with a magnetic stirring bar, distillation column with dry ice acetone cooling 169.6 g of poly(nBA-b-4VP), prepared according to example B is mixed with 42.4 g of LIAL125 A (MW 207). The reaction mass is heated to 130° C. and two portions of 1.0 g of 10% LiOMe (10% in MeOH) are added during 6 h at 115-130° C. The formed n-butanol (ca. 15.3 g) is distilled off at reduced pressure (20 mbara) to a SC of 99.8% to yield P (195 g) as a brown highly viscous liquid. Analysis via GPC as well as 1H-NMR indicate >95% conversion of the LIAL-OH. The composition is determined 1H NMR as poly([$nBA_{61}$-co-$LIALA_{14}$]-b-$4VP_{15}$). GPC analysis affords an Mn of 9430 g/mol and a PD of 1.34. The viscosity of the pure polymer is determined at 990 Pas at RT. The AV of the polymer is found at 62.6 mgKOH/g.

Example Q

Synthesis of poly([nBA-co-MPEG500A-co-LIALA]-b-4VP)

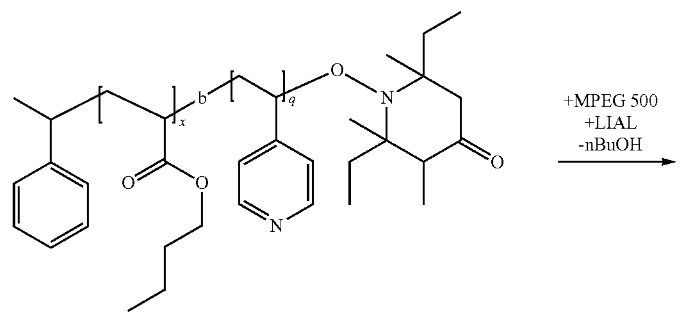

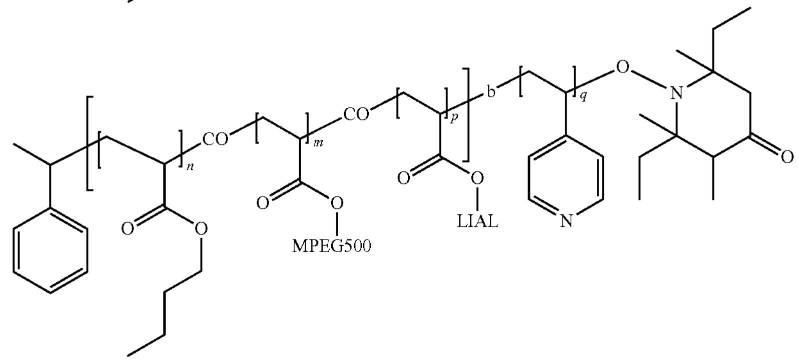

In a 350 mL flask equipped with a magnetic stirring bar, distillation column with dry ice acetone cooling 202.6 g of poly(nBA-b-4VP), prepared according to example B is mixed with 33.75 g of LIAL 125 A (MW 207) and 101.2 g of MPEG 500. The reaction mass is heated to 130° C. and two portions of 500 mg of LiOtBu are added during 7 h at 120-130° C. The formed n-butanol (ca. 27 g) is distilled off at reduced pressure (20 mbara) to a SC of 99.2% to yield Q (309 g) as a brown highly viscous liquid. Analysis via GPC as well as 1H-NMR indicate >95% conversion of the alcohols. The composition is determined by 1H NMR as poly([$nBA_{45}$-co-$MPEG500A_{11}$-co-$LIALA_{9}$]-b-$4VP_{14}$). GPC analysis affords an Mn of 11830 g/mol and a PD of 1.44. The viscosity of the pure polymer is determined at 348 Pas at RT. The AV of the polymer is found at 46.2 mg KOH/g Application Examples 1. Preparation of LS (Light Stabiliser) Dispersions (Additive Combination)

light stabiliser blend Z: sterically hindered amines (A-i) and (A-ii) (Tinuvin® 622 and 144) and compound (B-i) (Tinuvin® 312) at the weight ratio of 1:1:3

The LS dispersions are prepared in two different ways (for details see Table 3):

Method A: The below indicated formulation is prepared on the Disperser DAS 200 with a material/pearl ratio=½ by using 2 mm glass pearls.

Dispersion time: 90 minutes at 1000 rpm with an external cooling system at ca. 0° C. The LS powder is added to the liquid components (plasticizer+dispersant) before mixing.

Recipe: 20% of light stabiliser blend Z

X % of dispersing agent or dispersing agent formulation (1.2 or 2.4%)

100−(20+X) % of plactisizer (78.8 or 77.6%)

The LS dispersions according to method A are obtained as homogeneous thixotropic non-transparent white liquids.

Method B: The below indicated formulation is prepared in scale up on a Bead mill using a 0.6 l volume mill chamber (DYNO-Mill; Manufacturer: WAB, Switzerland) in closed loop at room temperature by using beads: 0.8-1.0 mm Silibeads Premium for the time indicated.

Milling time: Sample 8: 105 minutes

Sample 9: 165 minutes

Recipe: 20% of light stabiliser blend Z

X % of dispersing agent (1.2%)

100−(20+X) % of plasticizer (78.8 or 77.6%)

The LS dispersions according to method B are obtained as homogeneous thixotropic non-transparent white liquids.

2. Mixing of Light Stabilizer Dispersions (Additive Combination) into a Transparent MS Formulation and Application 0.8 g of the above light stabilizer dispersion prepared by method A or B (corresponds to 1.25% of active LS on total formulation) is added to 12 g of ready to use commercial MS-Sealants (UHU/Art. No.: 47 855—neutral crosslinking silane modified polymer (polyether backbone)) and mixed together in a SpeedMixer™ DAC 800 FVZ for 60 s at a speed of 2100 rpm at room temperature. The ready formulated sealants according to table 3 are then immediately applied to a glass substrate with a knife coater at a thickness of 2 mm to a surface of 10 $cm^2$ and cured at room temperature for 24 hours. The resulting films are evaluated and compared to a reference (samples 0 and 1 in Table 3).

Reference sample 0 in Table 3: The film of the original MS polymer (sealant) without LS is prepared showing full transparency.

Reference sample 1 in Table 3: In this sample the untreated powder form of LS is incorporated in the sealant material. Due to its large particle size the LS powder is inhomogeneously distributed in sealant sample 1. The large particles of the LS are easily accessed visually and causing an inhomogeneous appearance of the sealant film.

TABLE 3

| Sample No.. | Plasticizer | Dispersing agent of example | Conc. of dispersing agent (formulation)/(X % based on LS dispersion) | Method of preparation of LS dispersion | Conc. of light stabilizer blend Z/(% of total formulation) | Optical rating | Number of large, (>0.5 mm diameter) visible particles/1 $cm^2$ | Visual evaluation Clarity |
|---|---|---|---|---|---|---|---|---|
| 0 | — | — | — | | — | clear, transparent | not relevant | 5 |
| 1 | — | — | — | | 1.25 | inhomogeneous | >15 | not relevant |
| 2 | DIDP | N | 2.4 | A | 1.25 | homogeneous | 0 | 3 |
| 3 | DIDP | N | 1.2 | A | 1.25 | homogeneous | 0 | 4 |
| 4 | DIDP | D | 1.2 | A | 1.25 | homogeneous | 0 | 4 |
| 5 | DIDP | D | 2.4 | A | 1.25 | homogeneous | 0 | 3 |
| 6 | DINCH | N | 2.4 | A | 1.25 | homogeneous | 0 | 2 |
| 7 | DINCH | D | 1.2 | A | 1.25 | homogeneous | 0 | 4 |
| 8 | DINCH | D | 1.2 | B | 1.25 | homogeneous | 0 | 3 |
| 9 | DINCH | D | 1.2 | B | 1.25 | homogeneous | 0 | 4 |

Plasticizers:
1) DIDP: Palatinol ® 10-P, Bis-(2-propylheptyl) phthalate from company BASF SE
2) DINCH: Hexamoll ® DINCH: Dicarboxylic acid ester: Di-isononylcyclohexan-1,2-dicarboxylat from company BASF SE Visual Evaluation:

The clarity and haziness and the number of the particles are evaluated visually and correlated to a "Haze gard plus" spectrometer according to ASTM-1003.

The visual evaluation is based for each sample by double determination.

The levels of the visual evaluation can be classified according to the norm ASTM-1003 in different groups as summarized in the following Table 4.

TABLE 4

| level | Rating | Visual appearance | Haze according to the norm ASTM-1003/(%) |
|---|---|---|---|
| 1 | very poor | opaque, no transparency | >90 |
| 2 | poor | strong haze | 76-90 |
| 3 | fair | distinct haze | 61-75 |
| 4 | good | slight haze | 45-60 |
| 5 | excellent, fully transparent | no haze visible | <45 |

The invention claimed is:

1. A composition comprising:

(A) at least two sterically hindered amines selected from the group consisting of a compound of formula (A-i), a compound of formula (A-ii), a compound of formula (A-iii), a compound of formula (A-iv), and a compound of formula (A-v);

(B) at least one of a compound of formula (B-i) or formula (B-ii);

(C) at least one dispersant of formula (C-i); and (D) at least one plasticizer (D); and, optionally, (E) at least one non-resin additive (E), and/or, optionally, (F) at least one resin (F);

wherein sterically hindered compounds of formulas (A-i), (A-ii), (A-iii), (A-iv) and A-v) are described by the following chemical structures:

(A-i)

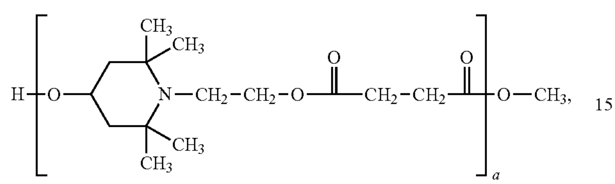

where a ranges from 2 to 50;

(A-ii)

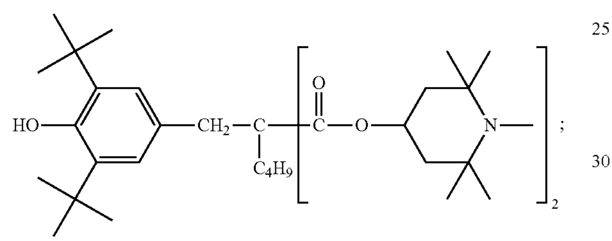

(A-iii)

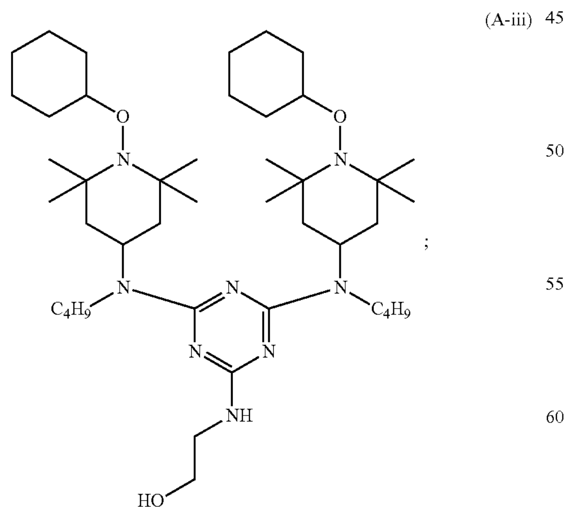

R—NH—$(CH_2)_3$—N(R)—$(CH_2)_2$—N(R)—$(CH_2)_3$—NH—R, wherein R is (A-iv)

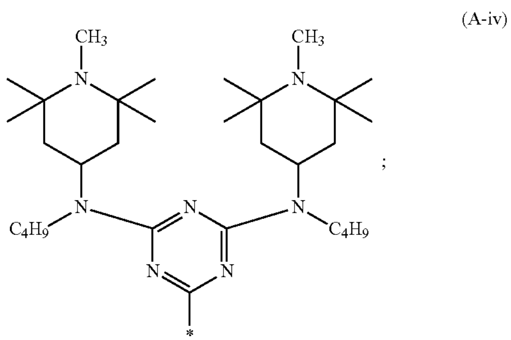

(A-v)

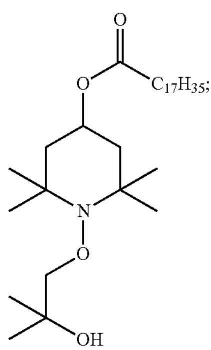

wherein the compounds of formulas (B-i) and (B-ii) are described by the following chemical structures:

(B-i)

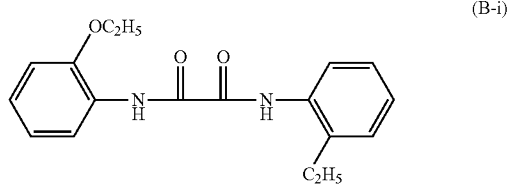

(B-ii)

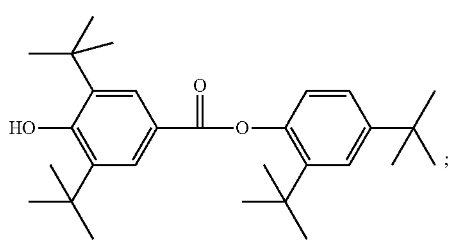

wherein the dispersant of formula (C-i) is described by the following chemical structure:

(C-i)

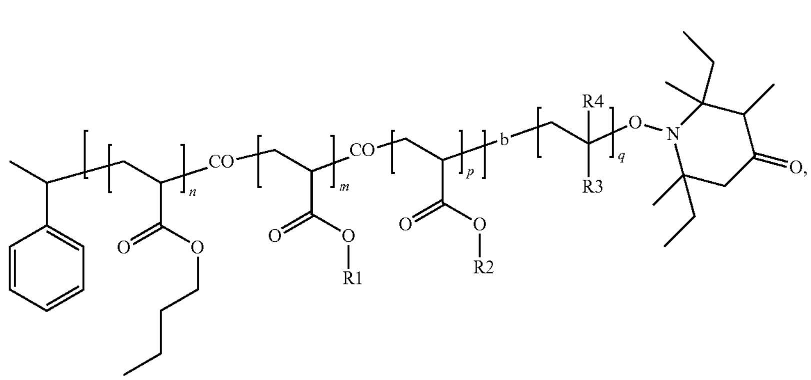

where R1 is —$(CH_2—CH_2—O)_r$—R5, wherein r ranges from 2 to 100, and R5 is branched $C_1$-$C_{18}$alkyl or linear $C_1$-$C_{18}$alkyl;

R2 is linear $C_8$-$C_{20}$alkyl or branched $C_3$-$C_{20}$alkyl,

R3 is $C_6$-$C_{12}$aryl, di-$C_1$-$C_4$dialkyl-amino$C_2$-$C_6$alkylene, or $C_2$-$C_{12}$aminoaryl having 1 to 3 ring-nitrogen atoms, wherein an aryl group and an aminoaryl group are unsubstituted or substituted by $C_1$-$C_4$alkyl, R4 is H or $CH_3$, n and q are independently integers from 3 to 100, and m and p are independently integers from 0 to 100.

2. The composition of claim 1, wherein the at least two sterically hindered amines are compounds of formula (A-i) and formula (A-ii).

3. The composition of claim 1, wherein (B) comprises at least one compound of formula (B-i).

4. The composition of claim 1, wherein the dispersant (C) is a compound of formula (C-i) where:

R1 is —$(CH_2—CH_2—O)_r$—R5 where r is 2-20, and R5 is linear $C_1$-$C_4$alkyl,

R2 is linear $C_{10}$-$C_{18}$alkyl, branched $C_{10}$-$C_{18}$alkyl, or linear and branched $C_{10}$-$C_{18}$alkyl, R3 is pyridine, R4 is H, n is an integer from 20 to 90, q is an integer from 5 to 30, m is an integer from 0 to 60, and p is an integer from 0 to 30.

5. The composition of claim 1, wherein the plasticizer (D) is selected from the group consisting of a cyclohexane dicarboxylic acid ester, a phthalate, a trimellitate, an adipate, a maleate, a benzoate, a citrate, a vegetable oil, a succinate, a sebacate, a fatty acid ester, a sulfonamide, an organophosphate, a glycol, a polyether, a polybutene, an acetylated monoglyceride, an alkyl sulphonic acid phenyl ester, and any mixture thereof.

6. The composition of claim 1, further comprising at least one additive (E) selected from the group consisting of a solvent, a surfactant, an antioxidant, a light stabiliser, a metal deactivator, a phosphite, a phosphonite, a hydroxylamine, a nitrone, a thiosynergist, a peroxide scavenger, a basic co-stabilizer, a filler, a reinforcing agent, a lubricant, an emulsifier, a pigment, a dye, a rheology additive, a catalyst, a flow-control agent, an optical brightener, a flame-proofing agent, an antistatic agent, a benzofuranone, an indolinone, an anti-gas fading agent, and any combination thereof.

7. The composition of claim 6, further comprising at least one resin (F).

8. The composition of claim 1, wherein a weight ratio between two of the at least two sterically hindered amines (A) ranges from 1:0.1 to 1:10, a weight ratio of (A) the at least two sterically hindered amines to the at least one compound (B-i) or (B-ii) ranges from 1:0.1 to 1:20, a weight ratio of the at least two sterically hindered amines to the dispersant (C) ranges) from 10:0.1 to 10:20, a weight ratio of the at least two sterically hindered amines to the plasticiser (D) ranges from 1:0.1 to 1:50, and when additive (E) is present then a weight ratio of the dispersant (C) to additive (E) ranges from 1:0.01 to 1:30 .

9. A composition of matter, comprising:

an organic material susceptible to degradation by light, oxygen, heat, or any combination thereof; and the composition of claim 1.

10. The composition of matter of claim 9, wherein the organic material is a sealant or an assembly adhesive.

11. The composition of matter of claim 9, wherein the organic material is at least one selected from the group consisting of a polysulphide, a rubber, an acrylate, a silicone, a functionalized polyether, a functionalized polyester, a functionalized polyacrylate, and a functionalized polyurethane.

12. The composition of matter of claim 9, wherein the amount of said composition in the composition of matter ranges from 0.005 to 0.5 parts by weight the organic material.

13. A process for stabilising an organic material susceptible to degradation by light, oxygen, heat, or any combination thereof against degradation by light, oxygen, heat, or any combination thereof, comprising:

applying the composition of claim 1 to the organic material in need thereof or incorporating said composition into the organic material in need thereof.

14. The composition of claim 1, comprising:

(A) at least two sterically hindered amines of formula (A-i) and formula (A-ii);

(B) at least one compound of formula (B-i);

(C) at least one dispersant of formula (C-i), wherein r ranges from 2 to 20, R3 is pyridine, R4 is H and R5 is $C_1$-$C_4$alkyl, m is an integer ranging from 5 to 25, n is an integer ranging from 40 to 80, p is 0 and q is an integer ranging from 5 to 25; and (D) at least one plasticizer selected from the group consisting of a cyclohexane dicarboxylic acid ester or phthalate.

15. The composition of claim 8, comprising resin (F), wherein a weight ratio of the dispersant (C) to the resin ranges from 1:1 to 1:30.

16. The composition of claim 15, wherein the weight ratio between two of the at least two sterically hindered amines (A) ranges from 1:0.3 to 1:8, the weight ratio of (A) the at least two sterically hindered amines to the at least one compound (B) ranges from 1:0.15 to 1:15, the weight ratio of (A) the at least two sterically hindered amines to the dispersant (C) ranges from 10:0.5 to 10:10, the weight ratio of the at least two sterically hindered amines to the plasticizer (D) ranges from 1:1 to 1:30, when the additive (E) is present, the weight ratio of the dispersant to the additive ranges from 1:0.05 to 1:10, when resin (F) is present, then the weight ratio of the dispersant (C) to the resin (F) ranges from 1:2 to 1:15.

17. The composition of matter of claim 11, wherein the organic material comprises:

a functionalized polyether functionalized by silane, a functionalized polyester functionalized by silane, a functionalized polyacrylate functionalized by silane, a functionalised polyurethane functionalized by silane, or any combination thereof.

18. A moisture or water barrier comprising the composition of claim 1.

19. A deck bonding sealant, port hole sealant, glazing, window sealant, bathroom water-barrier sealant, or cable sealant comprising the composition of claim 1.

20. A method for stabilizing an organic material susceptible to degradation by light, oxygen or heat comprising contacting the composition of claim 1 with said organic material.

21. The composition of claim 1 that comprises at least one resin (F) selected from the group consisting of polysulphides, rubbers, acrylates, silicones, functionalised polyethers, functionalised polyesters, functionalized polyacrylates and functionalised polyurethanes.

* * * * *